UNITED STATES PATENT OFFICE.

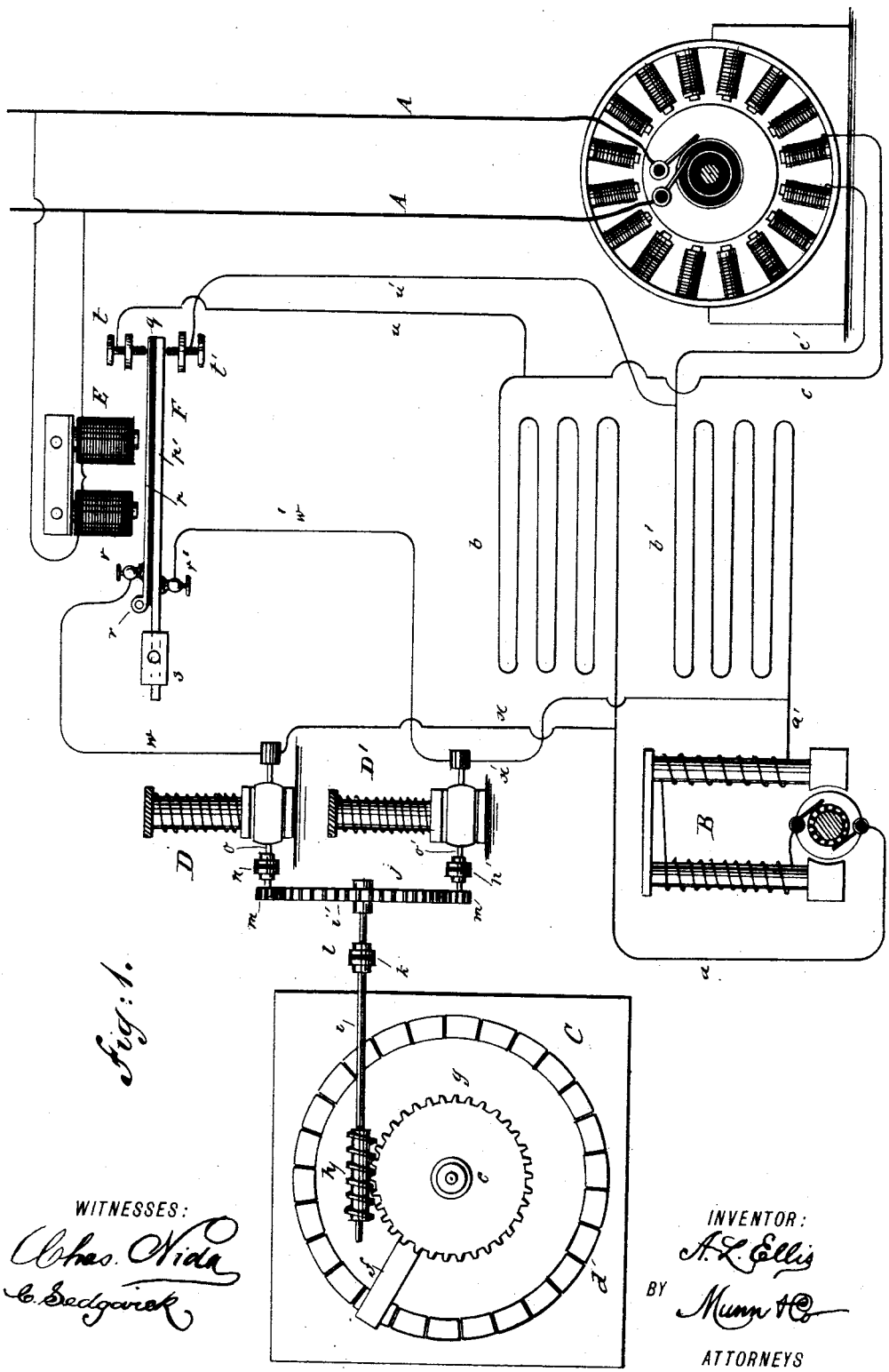

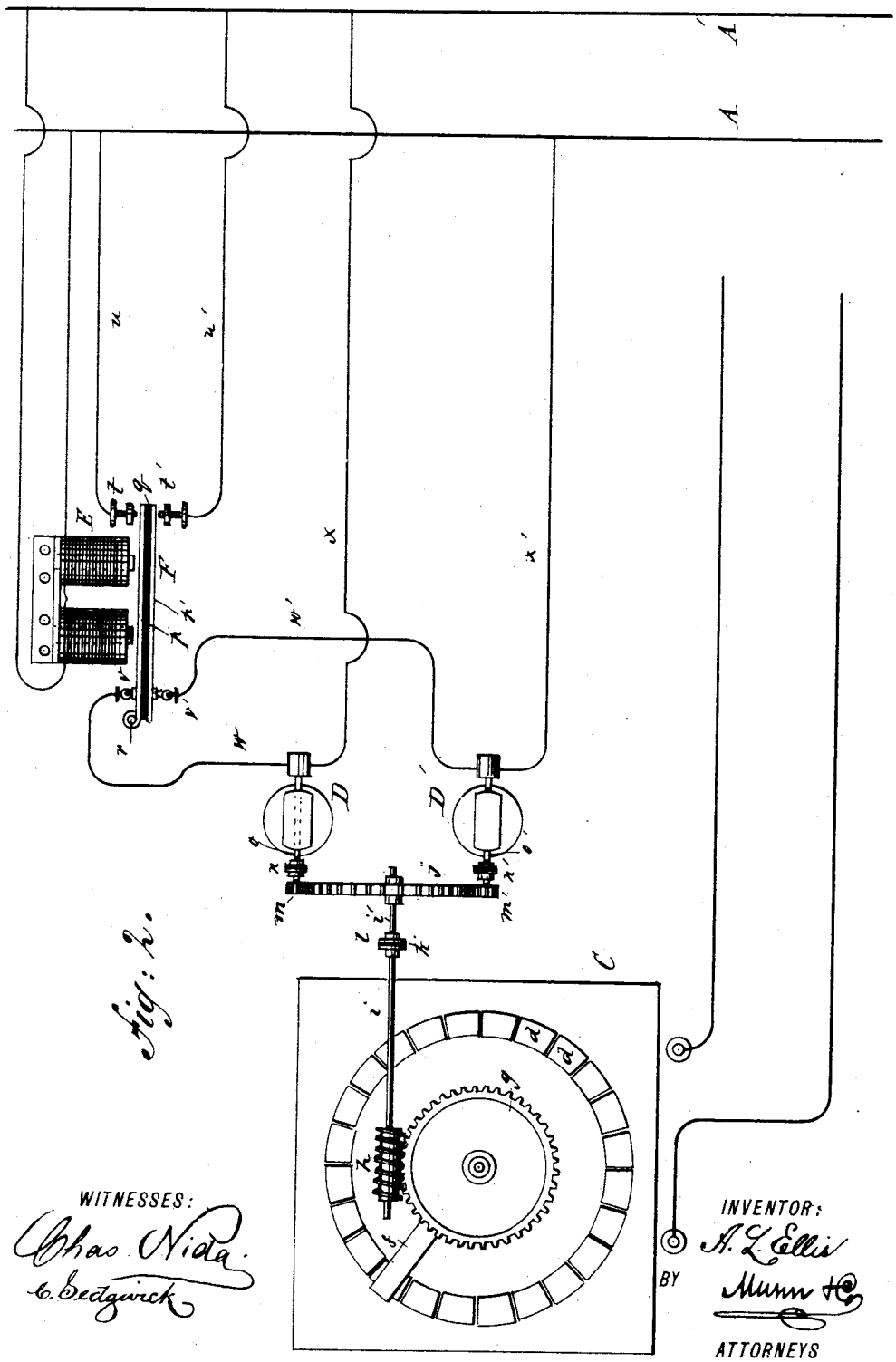

ALVIRUS 'LONZO ELLIS, OF KANSAS CITY, MISSOURI.

AUTOMATIC POTENTIAL-REGULATOR FOR ELECTRIC CURRENTS.

SPECIFICATION forming part of Letters Patent No. 446,284, dated February 10, 1891.

Application filed July 3, 1890. Serial No. 357,595. (No model.)

*To all whom it may concern:*

Be it known that I, ALVIRUS 'LONZO ELLIS, of Kansas City, in the county of Jackson and State of Missouri, have invented a new and Improved Automatic Potential-Regulator for Electric Currents, of which the following is a specification, reference being had to the annexed drawings, forming a part thereof, in which—

Figure 1 is a diagrammatic view of my apparatus applied to an alternating-current system, and Fig. 2 is a similar view of the apparatus applied to a direct-current system.

Similar letters of reference indicate corresponding parts in both views.

The object of my invention is to provide an improved automatic potential-regulator for controlling the potential of the current in an electric circuit carrying either a direct or an alternating current.

The invention is embodied in the construction and combination of parts hereinafter described and claimed.

My invention consists in the combination, with a potential-regulating device of known construction, of a pair of electric motors connected with the potential-controlling devices and with the main circuit, and a circuit-controlling magnet and armature arranged to send the current to one or the other of the motors, thus operating the potential-controlling device in accordance with the requirements of the circuit, all as hereinafter more fully described.

The main conductors A A' are connected with an alternating-current dynamo and lead to the translating devices in the external circuit. The exciter-dynamo B is connected by the conductors $a$ $a'$ with the resistances $b$ $b'$, which in turn are connected with the field-magnet of the alternating-current dynamo by the wires $c$ $c'$.

The device C, which may be a rheostat of the usual construction, or a switch for cutting in or out coils of a field-magnet, or a potential-regulating device of any other well-known character, is provided with metallic segments $d$ and with a central spindle $e$, to which is attached the arm $f$, also the worm-wheel $g$. The worm $h$, on the shaft $i$, engages the worm-wheel $g$, and the said shaft $i$ is connected with the shaft $i'$ of the spur-wheel $j$ by means of the coupling $k$, which is provided with an intermediate insulating-section $l$. Pinions $m$ $m'$ engage the spur-wheel $j$ upon diametrically-opposite sides, and the shafts of the said pinions are connected by insulating-couplings $n$ $n'$ with the armature-shafts $o$ $o'$ of the electric motors D D'.

The high-resistance electro-magnet E is connected in a shunt across the main conductors A A'. The armature F of the said electro-magnet is formed of the metallic plates $p$ $p'$, of which the plate $p$ is of soft iron. The said plates $p$ $p'$ are separated by an insulator $q$, and the plate $p$, which forms the armature, is pivoted on a pin $r$, the plate $p'$ being prolonged beyond the pin and provided with a counter-weight $s$, by which the armature F may be nearly counterbalanced. The free end of the armature F plays between the armature-screws $t$ $t'$, and is arranged to form a contact with either of the said screws. The screw $t$ is connected by a wire $u$ with the wire $c$, extending from the resistance $b$ to the field-magnet of the alternating-current dynamo, and the screw $t'$ is connected by a wire $u'$ with the wire $c'$ leading from the resistance $b'$ to the field-magnet of the alternating-current dynamo. The plate $p$ is provided with a binding-post $v$, which is connected by a wire $w$ with one of the brushes of the motor D, and the plate $p'$ is provided with a binding-post $v'$, which is connected by the wire $w'$ with one of the brushes of the motor D'. The remaining brush of the motor D is connected by the wire $x$ with the wire $a$, leading from the exciter-dynamo B to the resistance $b$, and the remaining brush of the motor D' is connected by the wire $x'$ with the wire $a'$ leading from the exciter-dynamo B to the resistance $b'$.

When the pressure of the current on the conductors A A' increases above the normal, the high-resistance magnet E becomes active, and, attracting the armature F, forms contact between the plate $p$ of the said armature and the contact-screw $t$, thereby closing the circuit through the motor D, when a portion of the current from the exciter-dynamo B passes through the conductors $a$ $x$, the motor D, the wire $w$, binding-post $v$, plate $p$, contact-screw $t$, wire $u$, wire $c$ through the field-magnet of the alternating-current dynamo, returning by the wire $c'$, resistance $b'$, and wire $a'$ to the exciter-dynamo B. Then the motor D revolves in a direction to move the arm $f$ upon the segments $d\ d$, so as to throw in more or less resistance, or by some other well-known means to reduce the pressure of the current in the main-circuit wires, another portion of the current passes directly from the wire $a$ through the resistance $b$ to the wire $c$. When the pressure is reduced to the normal, the armature F is released, so that its free end is held midway between the screws $t\ t'$, when the motors will be inactive and the potential-regulating device will remain stationary.

When the potential in the main circuit is reduced below the normal, the electro-magnet E releases the armature F, so that it forms a contact with the screw $t'$ when a portion of the current from the exciter-dynamo B passes through the wire $a'$, wire $x'$, the motor D', wire $w'$, binding-post $v'$, plate $p'$, contact-screw $t'$, wire $u'$, the wire $c'$, through the field-magnet of the alternating-current dynamo, returning by the wire $c$, the resistance $b$, and wire $a$ to the exciter-dynamo B, causing the motor D' to revolve in a direction opposite to that of the motor D, thus moving the arm of the regulating device in a direction required to increase the potential in the alternating-current dynamo. Another portion of the current passes from the wire $a'$ through the resistance $b'$ to the wire $c'$, and when the potential again becomes normal in the main-circuit wires A A' the free end of the armature F is supported midway between the contact-screws $t\ t'$.

In the apparatus shown in Fig. 2 the arrangement of the motors, the regulating device, the potential-controlling magnet, and the circuits is the same as that already described, with the exception of the omission of the exciter-dynamo and the resistances $b\ b'$. To adapt the mechanism to a direct-current system, the wires $x\ x'$ from the motors D D' are connected directly with the main conductors A A'; and the contact-screws $t\ t'$ are also connected with the main conductors A A'. The magnet E is connected with the main-circuit wires, as in the other case. In the present case the counterbalance-weight $s$ is omitted from the armature F. The controlling device C is placed in the shunt or field-magnet circuit of the dynamo which furnishes a current to the conductors A A', and the regulation of the pressure is effected by throwing more or less resistance into the field-magnet circuit. In this case when the potential is normal the free end of the armature F takes a position between the contact-screws $t\ t'$ without touching either of them. When the pressure of the current on the main circuit becomes too great, the attraction of the armature F by the magnet E brings it into contact with the screw $t$, thereby sending a current through the motor D, causing the arm $f$ of the rheostat to throw more resistance into the field-magnet circuit, thereby diminishing the pressure on the main conductors. When the potential becomes normal, the armature F is released, when it again occupies a middle position between the two contact-screws $t\ t'$. When the potential in the main circuit passes below the normal, the armature F drops and makes an electric contact with the screw $t'$, when the current flows through the motor D', causing it to turn the arm $f$ of the rheostat in the opposite direction, thereby cutting out more or less of the resistance, thus increasing the pressure in the main circuit, bringing it up to the normal so that the magnet E again attracts the armature F with such force as to hold it out of contact with the screw $t'$.

It will be observed that the motors D D' must necessarily be arranged and connected up in the circuit so as to run in opposite directions whenever a current is sent through them. The resistance of the electro-magnet E is such as to allow only a very small fraction of the main current to pass from one conductor to the other.

The resistance of the motors D D' or the external-motor circuits must be such as to allow only enough current to pass through them to produce the required motor-power to operate the different pressure-regulating devices to which it may be attached, thus preventing the use of more current than is necessary.

Having thus described my invention, I claim as new and desire to secure by Letters Patent—

In an automatic potential-regulator for electric currents, the combination of the high-resistance magnet E, the armature F, formed of the plates $p\ p'$, the contact-screws $t\ t'$, the motors D D', provided with pinions $m\ m'$, the spur-wheel $j$, the shafts $i\ i'$, provided with the insulating-coupling $k$, the worm $h$, the potential-controlling device C, furnished with the segments $d\ d'$, the spindle $e$, the worm-wheel $g$, and the electric-circuit connections, substantially as specified.

ALVIRUS 'LONZO ELLIS.

Witnesses:
CHARLES S. CHAPMAN,
EDWARD E. BLAKE.